May 14, 1957  W. MERRY  2,791,915
DUAL DRIVING MECHANISM
Filed June 25, 1952  3 Sheets-Sheet 1

INVENTOR.
WALTER MERRY.
BY
Robert A. Sloman
ATTORNEY.

May 14, 1957  W. MERRY  2,791,915
DUAL DRIVING MECHANISM
Filed June 25, 1952  3 Sheets-Sheet 2

INVENTOR.
WALTER MERRY
BY
Robert A. Sloman
ATTORNEY

May 14, 1957 W. MERRY 2,791,915
DUAL DRIVING MECHANISM
Filed June 25, 1952 3 Sheets-Sheet 3
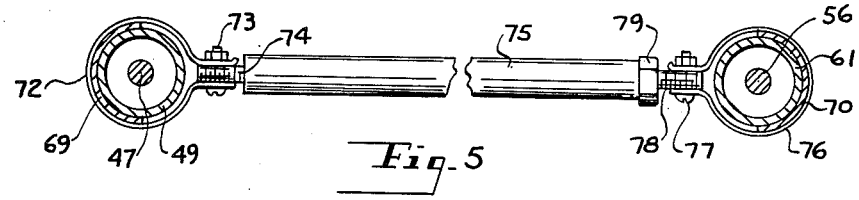
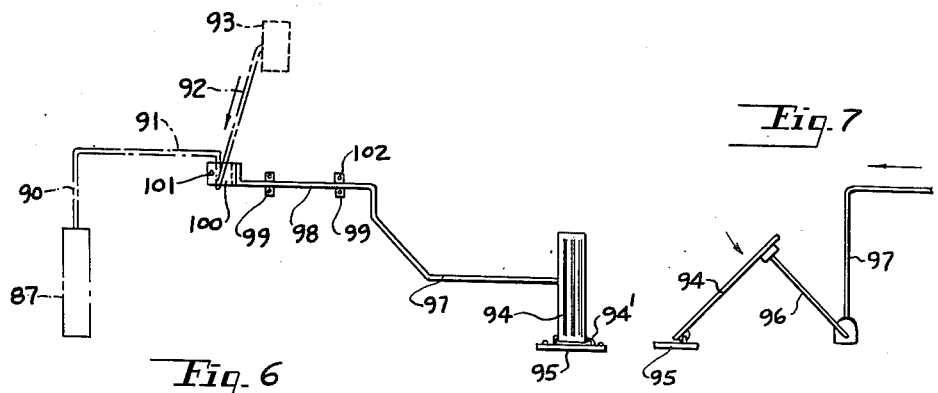
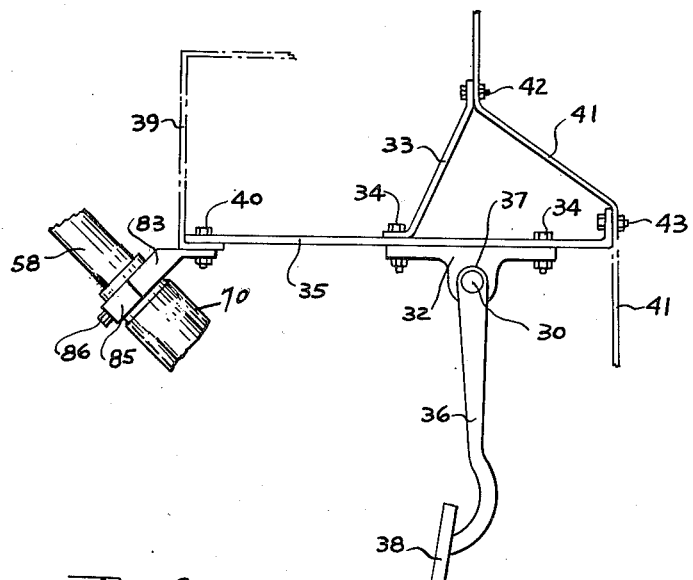
INVENTOR.
WALTER MERRY.
BY
*Robert A. Sloman*
ATTORNEY

United States Patent Office 2,791,915
Patented May 14, 1957

2,791,915

DUAL DRIVING MECHANISM

Walter Merry, River Rouge, Mich.

Application June 25, 1952, Serial No. 295,503

1 Claim. (Cl. 74—562.5)

This invention relates to a dual driving mechanism, and more particularly to a dual control device for operating and steering a vehicle.

It is the object of the present invention to provide a novel dual control mechanism for the auxiliary driving side of vehicle providing similar controls for operating the brakes, the clutch, the accelerator and for steering.

It is the object of the present invention to provide a novel and simplified dual control mechanism for a vehicle which may be easily installed in a conventional vehicle.

It is the further object of this invention to provide dual steering, clutching, braking, and accelerating mechanisms upon the auxiliary driving side of the vehicle whereby the same may be controlled from either the driving side thereof or the auxiliary driving side thereof alternately.

These and other objects will be seen from the following specification and claims in conjunction with the appended drawings in which:

Fig. 5 is a section taken on line 5—5 of Fig. 3.

Fig. 6 is a fragmentary plan view illustrating the dual accelerating mechanism.

Fig. 7 is a right end view thereof; and

Fig. 8 is a side elevational view illustrating the mounting of the auxiliary brake actuating mechanism with respect to the vehicle dashboard, steering wheel and fire wall.

It will be understood that the above drawings illustrate merely a preferred embodiment of the invention, and that other embodiments are contemplated within the scope of the claims hereafter set forth.

Figure 1:
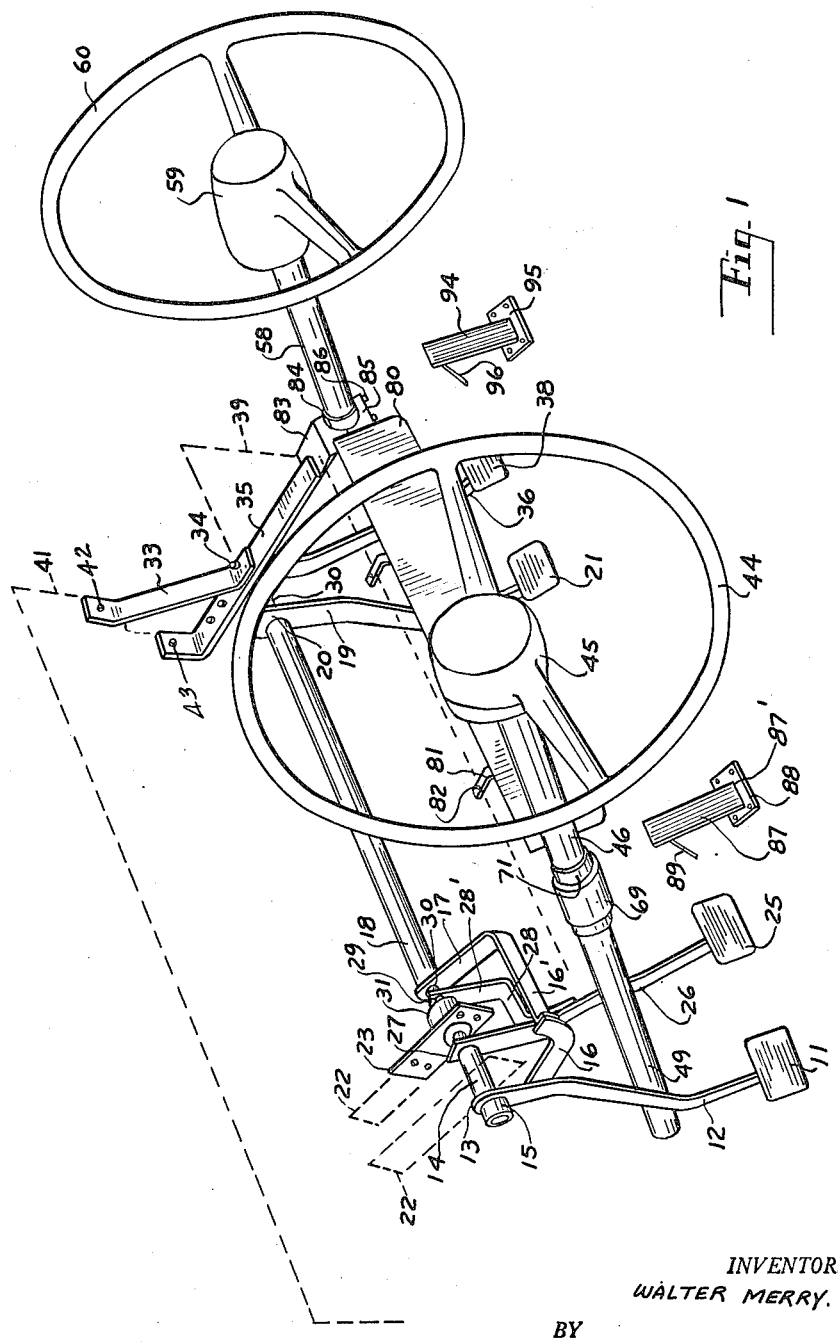
Fig. 1 is a fragmentary perspective view illustrating the dual control mechanism for the vehicle.
Figure 2:
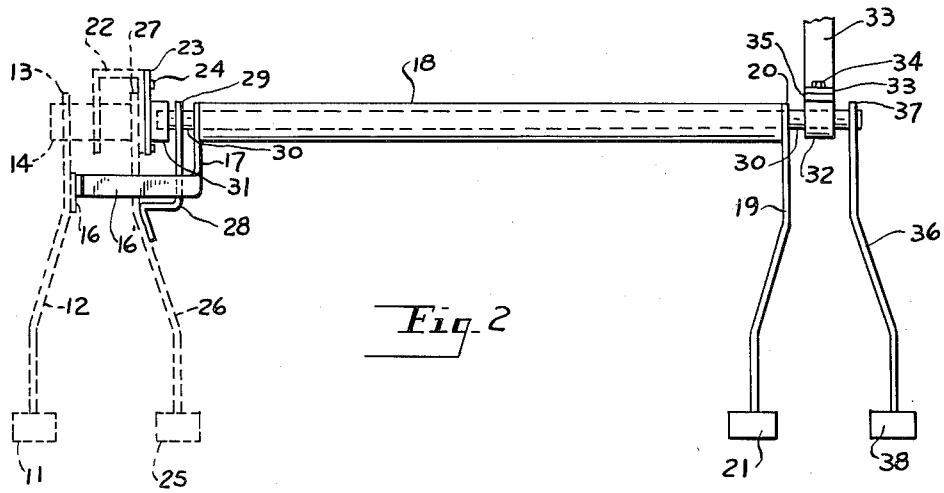
Fig. 2 is a fragmentary plan view illustrating the dual clutch and brake operating mechanism.

Referring to the drawings, Figs. 1 and 2, there is shown a conventional clutch pedal 11 secured at the lower end of the substantially upright clutch operating arm 12 which is rockably suspended at its upper end at 13 upon the horizontally arranged support 14 which is suitably secured to the vehicle frame, such as by the frame elements 22 shown in dotted lines. Said arm is secured upon support 14 by the securing device or nut 15 shown in Fig. 1.

Bracket element 16 projects rearwardly from the upper end of arm 12 and has a lateral extension 16' which terminates in a forwardly arranged extension 17, which is substantially parallel to bracket 16 and which is secured at its end to the rockable elongated tube 18. The auxiliary clutch operating substantially upright arm 19, having pedal 21 secured at its lower end, is secured at its upper end to the opposite end of the tube 18 as at 20, Figs. 1 and 2.

Rectangular plate 23 is secured to the vehicle frame element 22 by the bolts 24; and mounted upon plate 23 is a laterally arranged support or thrust bearing 31 adapted to receive and support one end of the rockable shaft 30 in the manner hereafter described.

The conventional brake pedal 25 is secured upon the lower end of the substantially upright brake operating arm 26; and said arm is rockably mounted at its upper end at 27 upon the same above described horizontally arranged support 14, as viewed in Figs. 1 and 2.

There is provided upon the upper portion of arm 26 a laterally arranged bracket 28, whose upwardly extending portion 28' is secured at its end as at 29 to the above mentioned rockable shaft 30. Said shaft extends loosely through the tube 18 providing a support for said tube upon which said tube may rock; and as above described one end of the shaft 30 is journaled and supported within the socket or thrust bearing 31 supported upon the vehicle frame element 22. It will be noted that shaft 30 as well as the tube 18 are co-axial with the horizontally arranged support 14 upon which the clutch and brake pedal operating arms 12 and 26 are rockably mounted.

The opposite end of the shaft 30 is supported within the bearing 32, which is supported and secured to the horizontal vehicle frame element 35 as by the bolts 34, as illustrated in Figs. 2 and 8.

As shown in Fig. 8, there is diagrammatically designated a portion of the vehicle fire wall 41 which is arranged forwardly of the dashboard 39 and is secured to the horizontally arranged frame element 35 by the bolt 43. There is also a reinforcing stay 33 which interconnects fire wall 41 and frame element 35, and is respectively secured thereto at its ends by the bolts 42 and 34.

Upon the auxiliary or non-driving side of the vehicle, there is provided a pair of spaced substantially upright auxiliary clutch and brake operating arms 19 and 36. Auxiliary brake pedal 38 is secured to the lower end of the auxiliary brake operating arm 36; and said arm is secured at its upper end at 37 to the outer end of shaft 30.

Consequently, Figs. 1 and 2 show the main clutch pedal 11 joined at its upper end by the bracket 16—16'—17 to one end of the rockable tube 18. The corresponding auxiliary clutch operating arm 19 is secured to the opposite end of the tube 18. Furthermore, the main brake operating arm 26 is secured by the bracket 28 to one end of the rockable shaft 30; and the corresponding auxiliary brake operating arm 36 is secured to the opposite end of the shaft 30 for movement in unison.

Figure 3:
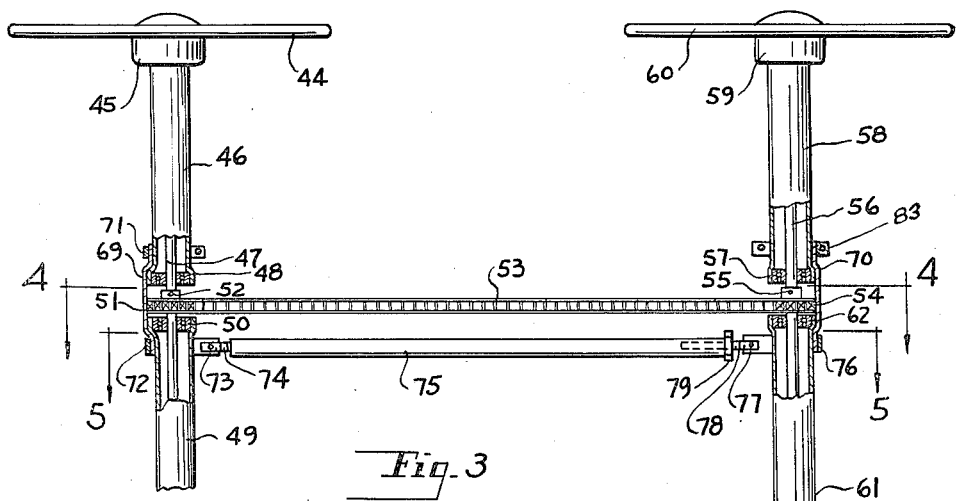
Fig. 3 is a fragmentary elevational view partially in section illustrating the dual steering mechanism.

The present device includes a dual steering mechanism which includes the primary steering wheel 44, its hub 45 and the primary steering post 47 which is secured to said steering wheel, the latter being journaled within the bearings 48 supported within the lower end of the post enclosing tube 46. There is also provided a second post enclosing tube 49 aligned with tube 46 with their adjacent ends spaced from each other as shown in Fig. 3 of the drawing; and post 47 is further journaled within the bearings 50 secured within the upper end of tube 49.

Sprocket gear 51 is secured at 52 upon post 47 intermediate the spaced ends of said tubes and is interconnected with a second sprocket gear 54 secured at 55 to the auxiliary steering post 56 by means of the sprocket chain 53 which extends around said sprocket gears and interconnects the same for movement in unison.

Auxiliary steering post 56 is spaced from and parallel to the primary steering post 47 and is positioned upon the auxiliary driving side of the vehicle. Said post also has a pair of aligned spaced enclosing tubes 58 and 61, and has secured at its upper end auxiliary steering wheel 60 with its depending hub 59. Said post is journaled within the bearings 57 and 62 which are secured within the adjacent spaced ends of the two post enclosing tubes 58 and 61 as shown in Fig. 3.

The lower end of auxiliary steering post 56 is journaled through bearing 63 which is positioned within the lower end of tube 61 and is secured to plate 66. Sleeve 64 secured to post 56 by the transverse set screw 65 is retainingly and rotatably positioned within an undercut circular recess formed within bearing 63 retaining said post 56 against axial displacement. Plate 66 is secured to the floor engaging plate 67 by the bolts 68.

Opposed semi-circular sleeves 69 and 70 overlap at their opposite ends the adjacent ends of the spaced tubes 46 and 49 and tubes 58 and 61 respectively. The upper overlapping portions of the sleeves 69 and 70 are secured to the corresponding tubes 46 and 58 by means of the clamp 71 and bracket 83. Additional clamps 72 and 76 secure the lower overlapping ends of the semi-circular sleeves to the corresponding post enclosing tubes 49 and 51 respectively; and these latter clamps are adjustably interconnected by the spacer tube 75 shown in Fig. 3. The oppositely threaded clamp extensions 74 and 78 are secured to the respective clamps 72 and 76 by the transverse pins 73 and 77 respectively; and the opposite ends of the extensions 74 and 78 threadedly engage corresponding opposite ends of the tube 75. Rotation of the tube 75 is thus adapted to provide a rigid adjustable connection between the clamps 72 and 76; and there is also provided a lock nut 79 upon extension 78 for securing the tube 75 in adjusted position.

Figure 4:
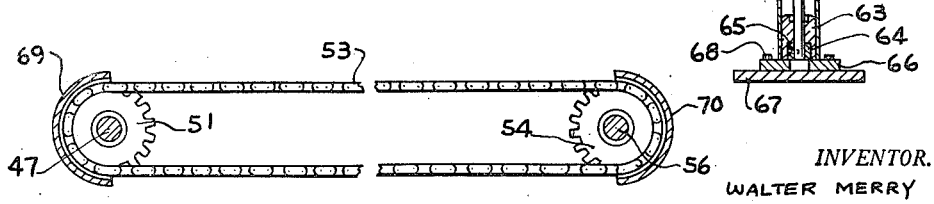
Fig. 4 is a section taken on line 4—4 of Fig. 3.

The semi-circular sleeves 69 and 70 are arranged with respect to the post enclosing tubes as to enclose and conceal the outer portions of the sprocket gears 51 and 54 and portions of the sprocket chain 53 as indicated in Fig. 4. The sprocket chain is furthermore enclosed by the transverse horizontally arrange plate 80 which is arranged above said sprocket chain as shown in Fig. 1 and is secured to the vehicle dashboard by the straps 81 and corresponding screws 82.

The auxiliary steering post enclosing tube 58 and the overlapping end of sleeve 70 are immovably retained with respect to the dashboard 39 by means of the bracket element 83, whose horizontal extension is secured to frame element 35 by means of the bolt 40 as illustrated in Fig. 8. Bracket 83 has a semi-circular recess 84 adapted to receive a portion of the sleeve 70. A complementary bracket element 85 with a similar recess engages around the opposite side of the sleeve 70 and is secured to the bracket 83 by the bolts 86.

There is also provided a dual accelerator mechanism illustrated in Figs. 1, 6 and 7 which includes the primary accelerator pedal 87 hinged at its lower end at 87' to the plate 88 which is adapted to be secured to the vehicle floor. Reciprocal rod 89 is joined at its upper end to the pedal 87 and loosely extends through the vehicle floor for engagement with the conventional linkage 90, 91 and 92 for operating the fuel control mechanism 93, which in the present instance is the conventional butterfly valve within the vehicle carburetor.

Arranged upon the auxiliary driving side of the vehicle is a second accelerator pedal 94 hinged at 94' to the mounting plate 95. As shown in Fig. 7, there is a second reciprocal rod 96 joined at its upper end to accelerator pedal 94, which also loosely extends through the vehicle floor and which is joined to a suitable linkage 97 and 98. The linkage element 98 has a plate 100 upon its end which is suitably secured as at 101 to a portion of the primary accelerator linkage 91 and 92; and the linkage element 98 is journaled and supported by means of the bracket elements 99 secured to the interior surface of the fire wall 41 as by the screws 102.

Consequently, by this construction it is apparent that the manual application of either of the accelerator pedals 87 or 94 will be effective for controlling the vehicle carburetor 93.

The present invention discloses a completely operative dual control mechanism for a vehicle which may be constructed as being integral of the vehicle when manufactured, but on the other hand may be easily adapted to an existing vehicle of the type disclosed herein.

Having described my invention, reference should now be had to the claims which follow for determining the scope thereof.

I claim:

In combination with a motor vehicle, dual brake and clutch operating means including primary brake and clutch pedals on the driver's side of the vehicle and auxiliary brake and clutch pedals on the auxiliary driving side of the vehicle, a horizontally arranged support mounted upon the vehicle frame above said primary pedals, spaced substantially upright arms joined at their lower ends to the primary brake and clutch pedals respectively, and rockably mounted at their upper ends upon said support, a horizontally arranged rockable shaft positioned above said auxiliary pedals, arranged axially of said horizontally arranged support and rockably mounted at its ends upon the vehicle frame, an elongated tube positioned concentrically over said shaft and rockable thereon, additional spaced substantially upright arms joined at their lower ends to the auxiliary brake and clutch pedals respectively, the latter brake pedal arm being secured at its upper end to one end of said shaft, and said latter clutch pedal arm being secured at its upper end to one end of said tube, and separate bracket means on said primary brake and clutch arms respectively secured to the other ends of said shaft and tube.

References Cited in the file of this patent

UNITED STATES PATENTS

| 743,908 | Minton | Nov. 10, 1903 |
| 1,055,435 | Zapf | Mar. 11, 1913 |
| 1,274,978 | Bishop | Aug. 6, 1918 |
| 2,052,764 | Harrison | Sept. 1, 1936 |
| 2,406,261 | Sprinkel | Aug. 20, 1946 |
| 2,485,759 | Miller | Oct. 25, 1949 |
| 2,544,635 | Ostrow | Mar. 6, 1951 |
| 2,645,948 | Beckman | July 21, 1953 |

FOREIGN PATENTS

| 570,981 | France | Jan. 24, 1924 |

OTHER REFERENCES

Publications: Traffic Eng. and Safety Dept., American Automobile Assn: "Simplified Basic Dual Control," p. 1, 1938; "Instructions for Installing 1949 Pontiac Dual Controls," Sept. 8, 1950; "New 1953 Dual Controls," 1952; "New Bar Tube Dual Controls," July 18, 1952.